United States Patent [19]
Iwasaki

[11] Patent Number: 4,869,710
[45] Date of Patent: Sep. 26, 1989

[54] MULTIPLE FREEWHEEL FOR BICYCLE
[75] Inventor: Yoshihisa Iwasaki, Sakai, Japan
[73] Assignee: Maeda Industries, Ltd., Osaka, Japan
[21] Appl. No.: 271,505
[22] Filed: Nov. 15, 1988
[30] Foreign Application Priority Data
  Dec. 2, 1987 [JP] Japan .................. 62-184066[U]
[51] Int. Cl.⁴ .................................. F16H 55/12
[52] U.S. Cl. ......................................... 474/160
[58] Field of Search ................. 474/78, 160, 164; 192/64; 308/192; 280/160.1, 238

[56] References Cited
U.S. PATENT DOCUMENTS
4,145,095  3/1979  Segawa .................. 474/160 X
4,278,265  7/1981  Nagano .................. 474/160 X
4,296,850 10/1981  Isobe ..................... 474/160 X Primary Examiner—Thuy M. Bui
Attorney, Agent, or Firm—William H. Eilberg

[57] ABSTRACT

A multiple freewheel for a bicycle comprises a set of diametrically different sprockets axially fitted onto a sprocket ring or carrier which is rotatably supported on an inner ring via a one-way clutch. The sprocket set is preassembled by retainer pins each of which has an enlarged head engaging with an axially innermost sprocket of the set and penetrates through the set to project out from an axially outermost sprocket of the set in press-fit engagement therewith. A nut member is screwed on the sprocket ring to press the pin tip out of press-fit engagement with the outermost sprocket.

11 Claims, 4 Drawing Sheets

MULTIPLE FREEWHEEL FOR BICYCLE

BACKGROUND OF THE INVENTION

1. Field of the Invention

This invention relates generally to a bicycle freewheel which is used to transmit only a forward driving force while allowing idle or inertial running of the bicycle. More specifically, the invention relates to a multiple freewheel for a bicycle which includes a set of diametrically different sprockets to further enable speed selection.

2. Description of the Prior Art

As is well known, the bicycle freewheel is generally mounted to the rear hub of the bicycle to constitute a rear gear which is connected via the chain to the chainwheel constituting a front gear. Forward pedalling causes the front gear and thereby the freewheel to drivingly rotate with the rear hub, consequently driving the bicycle forward. On the other hand, the freewheel allows forward rotation of rear hub in the absence of forward pedalling to enable idle forward running of the bicycle.

A typical multiple freewheel for a bicycle comprises an inner ring fixed to one side of the bicycle rear hub, an outer sprocket ring or carrier rotatably supported on the inner ring via a one-way clutch, and a set of diametrically different sprockets fitted axially onto the sprocket ring. Each sprocket has a central opening formed with engaging projections for engagement with axially extending spline grooves formed on the outer surface of the sprocket ring, so that the sprocket set co-rotates with the sprocket ring. The chain connected to the front gear engages with a selected sprocket of the freewheel but may be shifted to another selected sprocket to effect a speed change.

In assembly of the multiple freewheel, the individual sprockets must be separately fitted in succession onto the sprocket ring with their engaging projections aligned with the spline grooves of the sprocket ring. In so doing, further, spacer rings must also be fitted onto the sprocket ring to ensure suitable spacing between each two adjacent sprockets. Finally, a nut member is screwed on the sprocket ring to prevent axial displacement of the assembled set of sprockets and spacer rings. Therefore, such an assembling operation is unavoidably time-taking.

With a view to facilitating assembly, Japanese Utility Model Publication No. 55-23017 (Published: May 31, 1980; Applicant: Shimano Industrial Company; Inventors: Masashi NAGANO et al) discloses a multiple freewheel for a bicycle which incorporates a preassembled set of diametrically different sprockets to be axially fitted onto a sprocket ring or carrier. More specifically, each of the sprockets has preassembly holes at corresponding positions, and a bolt having an head in abutment with the largest sprocket is inserted through a corresponding preassembly hole of each sprocket to project out of the smallest sprocket. The projecting end of the bolt is threaded to engage in a nut which, when screwably advanced, comes into abutment with the smallest sprocket, thereby clamping the set of sprockets between the bolt head and the nut in a preassembled condition. After mounting of the preassembled set of sprockets onto the sprocket carrier, a stopper ring is fitted on the sprocket carrier to prevent axial displacement of the sprocket set.

With the preassembly type freewheel of the above Japanese publication, the set of sprockets are maintained in the preassembled condition even after mounting thereof onto the sprocket carrier. In other words, the individual sprockets have no independency once they are preassembled. This gives rise to a problem in replacing only one of the sprockets after complete assembly. In fact, it is needed to remove the entire set of sprockets before replacing a selected sprocket. Such a disadvantage becomes more significant particularly when only the smallest sprocket, which is located at a position for easiest access from outside, need be replaced.

SUMMARY OF THE INVENTION

It is, therefore, an object of the invention to provide a multiple freewheel for a bicycle which can be easily assembled while also ensuring easy replacement of a selected sprocket after assembly.

Another object of the invention is to provide a sprocket assembly which is incorporated in such a multiple freewheel.

According to the invention, there is provided a multiple freewheel for a bicycle comprising: an inner ring; an outer sprocket ring rotatably supported on the inner ring via a one-way clutch mechanism; a set of diametrically different sprockets fittable axially onto the sprocket ring for co-rotation therewith and including an axially innermost sprocket and an axially outermost sprocket; stopper means provided on the sprocket ring to engage with the innermost sprocket; preassembly holes formed at corresponding positions of each sprocket; a retainer pin insertable through a corresponding preassembly hole of each sprocket, the pin having an enlarged head engageable with the innermost sprocket, the pin further having a tip projectable from the outermost sprocket with press-fit engagement in the preassembly hole thereof to enable preassembly of the set of sprockets; and presser means removably mountable onto the sprocket ring to engage with the outermost sprocket while axially pressing the tip of the retainer pin out of press-fit engagement with the corresponding preassembly hole of the outermost sprocket.

With the arrangement described above, the set of sprockets are held in a preassembled condition before mounting thereof onto the sprocket ring, consequently facilitating assembly of the freewheel. After complete assembly, on the other hand, the retainer pins are brought out of press-fit engagement with the outermost sprocket (usually the smallest sprocket), so that the individual sprockets are independently removable after removing the presser means.

Other objects, features and advantages of the invention will be fully understood from the following description of the preferred embodiment given with reference to the accompanying drawings.

DETAILED DESCRIPTION

Figure 1:
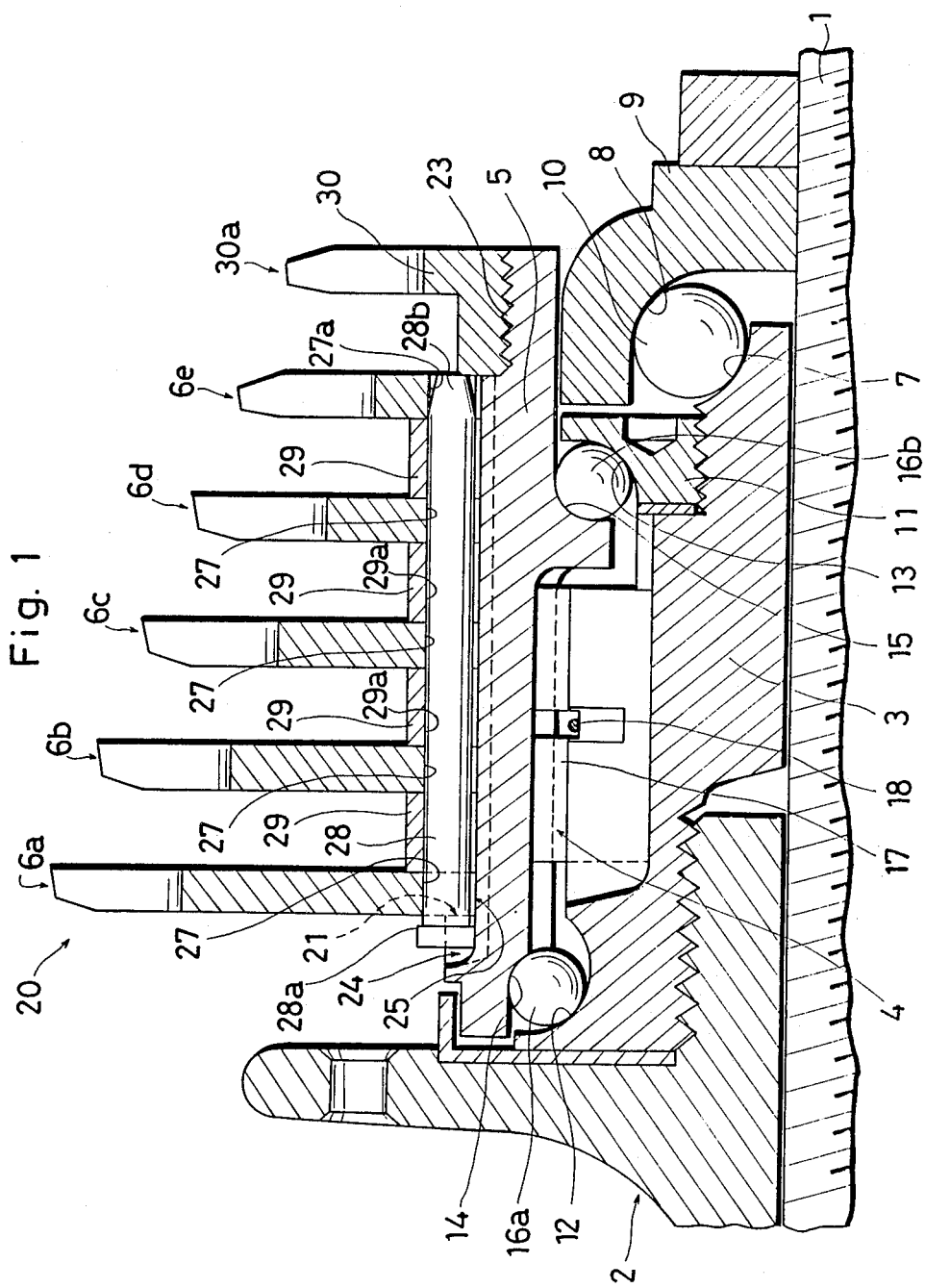
FIG. 1 is a fragmentary side view, in section, showing a multiple freewheel according to the invention in a completely assembled state.

Referring first to FIG. 1 of the accompanying drawings, a multiple freewheel according to the invention is shown as mounted to one end of a bicycle rear hub which includes a hub body or shell 2 rotatably supported on a hub shaft 1. The freewheel mainly comprises an inner ring 3 fixedly screwed to one end of the hub body 2, an outer sprocket ring 5 surrounding the inner ring 3 via a known one-way clutch or ratchet mechanism 4, and a set 20 of diametrically different sprockets 6a–6e carried on the sprocket ring 5.

The inner ring 3 has an outer end (right end in FIG. 1) formed externally with a first inner race 7. Axially outwardly of the inner ring 3 is disposed an end cup 9 which is fixed on the hub shaft 1 to internally provide a first outer race 8 opposed to the first inner race 7. A first annular series of balls 10 is interposed between the first inner and outer races 7, 8 to provide a first bearing which serves to rotatably support the illustrated one end of the hub body 2 on the hub shaft 1 indirectly through the inner ring 3 of the freewheel. Of course, a bearing (not shown) may be interposed directly between the illustrated one end of the hub body 2 and the hub shaft 1, thereby making it unnecessary to provide a bearing between the hub shaft 1 and the inner ring 3 of the freewheel.

The inner ring 3 further has an inner end (left end in FIG. 1) internally screwed on the illustrated one end of the hub body 2 and externally formed with a second inner race 12. On the other hand, the sprocket ring 5 has an inner end internally formed with a second outer race 14 in opposed relation to the second inner race 12. A second annular series of balls 16a is interposed between the second inner and outer races 12, 14 to constitute a second bearing.

A bearing ring 11 is screwed on the inner ring 3 of the freewheel at a position adjacent to the first inner race 7 to externally provide a third inner race 13. Further, the sprocket ring 5 is internally formed with a third outer race 15 in facing relation to the third inner race 13. A third annular series of balls 16b is interposed between the third inner and outer races 13, 15 to form a third bearing.

Thus, the sprocket ring 5 is rotatably supported on the inner ring 3 by means of the second and third bearings. However, the one-way clutch or ratchet mechanism 4 allows rotation of the inner ring 3 or the hub body 2 relative to the sprocket ring 5 only in one rotational direction (forward rotational direction) while prohibiting relative rotation therebetween in opposite rotational direction (backward rotational direction), as described below.

Figure 3:
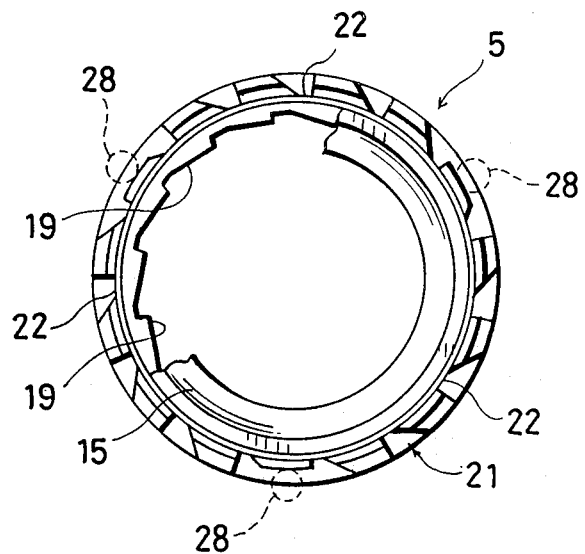
FIG. 3 is a reduced front view, partially removed, illustrating a sprocket ring or carrier incorporated in the freewheel shown in FIG. 1.
Figure 4:
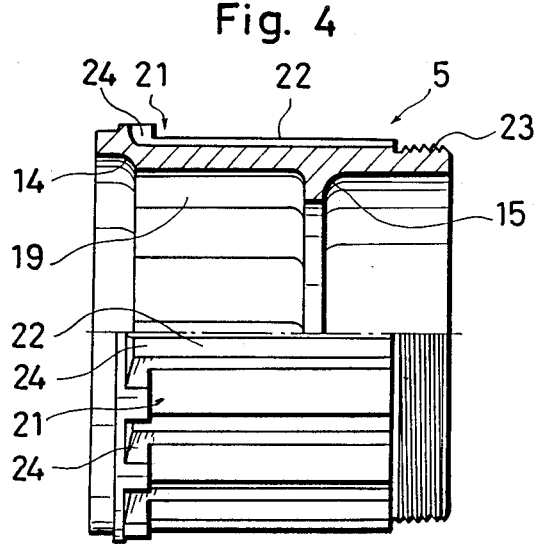
FIG. 4 is a side view, partially in section, showing the same sprocket ring.

The one-way clutch mechanism 4, which is arranged between the second and third bearings 16a, 16b, includes a diametrically opposite pair of ratchet pawls 17 (only one shown) each pivotally supported on the inner ring 3, and a circumferential series of axially extending ratchet teeth 19 formed on the inner surface of the sprocket ring 5 (see also FIGS. 3 and 4). Each ratchet pawl 17 is biased by a ring spring 18 to its engaging position for driving engagement with the ratchet teeth 19 only when the sprocket ring 5 is driven in the forward rotational direction. Therefore, forward driving rotation of the sprocket ring 5 results in simultaneous forward driving rotation of the hub body 2. On the other hand, the hub body 2 together with the inner ring 3 can idly rotate in the forward rotational direction relative to the sprocket ring 5, consequently enabling idle or inertial forward running of the bicycle. It should be noted in this connection that forward rotation of the hub body 2 or the inner ring 3 relative to the sprocket ring 5 corresponds to backward rotation of the sprocket ring 5 relative to the hub body 7.

As is well known, a selected one of the diametrically different sprockets 6a–6e is connected to a chain (not shown) which in turn is connected to a chainwheel or pedal gear (not shown) driven by cyclist's pedalling. The chain may be shifted to another selected one of the sprockets 6a–6e by a known derailleur to carry out an intended speed change.

As better shown in FIGS. 3 and 4, the inner end of the sprocket ring 5 is externally formed with an annular stopper flange 21 which comes into abutment with the innermost or largest sprocket 6a of the sprocket set 20. The sprocket ring 5 is further formed externally with a plurality of spline grooves 22 which extend axially from the stopper flange 21 to an externally threaded portion 23 provided at the outer end of the sprocket ring 5.

The annular stopper flange 21 is formed with a plurality of shelter recesses 24 for the purpose to be described hereinafter. According to the illustrated example, each shelter recess 24 is provided as an extension of a corresponding spline groove 24.

Figure 5:
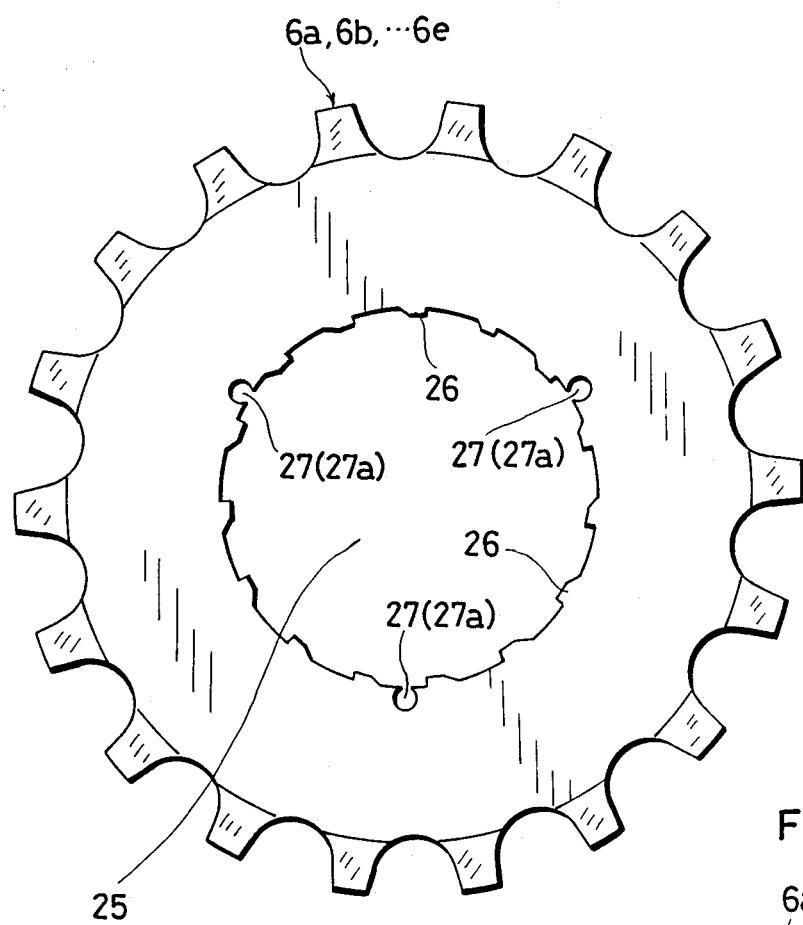
FIG. 5 is a front view, on a reduced scale, showing each sprocket incorporated in the freewheel of FIG. 1.
Figure 6:
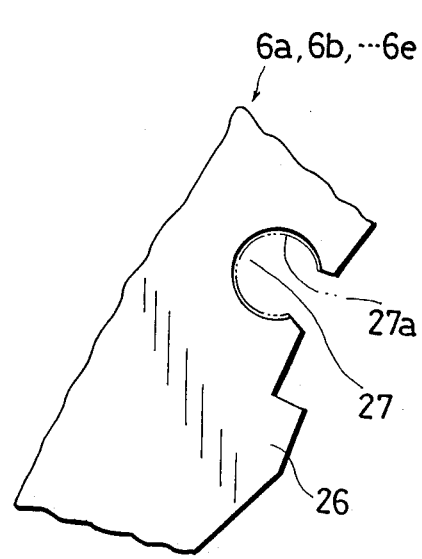
FIG. 6 is an enlarged fragmentary view showing only a portion of the sprocket.

As illustrated in FIGS. 5 and 6, each sprocket 6a (or 6b–6e) of the sprocket set 20 has a substantially circular central opening 25 for closely fitting on the sprocket ring 5. The central opening is formed with a plurality of engaging projections 26 for engaging in the respective spline grooves 22 of the sprocket ring 5, so that the sprocket always co-rotates with the sprocket ring inside.

Each sprocket is further provided with a plurality of preassembly holes 27 adjacent to the central opening 25 as suitably spaced circumferentially thereof. Each preassembly hole 27 is used to receive a retainer pin 28 which serves to retain the sprocket in axial alignment with the other sprockets before mounting of the sprocket set 20 on the sprocket ring 5. According to the illustrated example, the preassembly hole 27 is incompletely circular to merge with the central opening 25, but it must be so shaped as to prevent movement of the retainer pin 28 transversely thereof.

The respective sprockets 6a–6e of the set 20 are axially spaced from each other by intervening spacer rings 29, each of which has preassembly holes or cutouts 29a similar to those of each sprocket.

Figure 2:
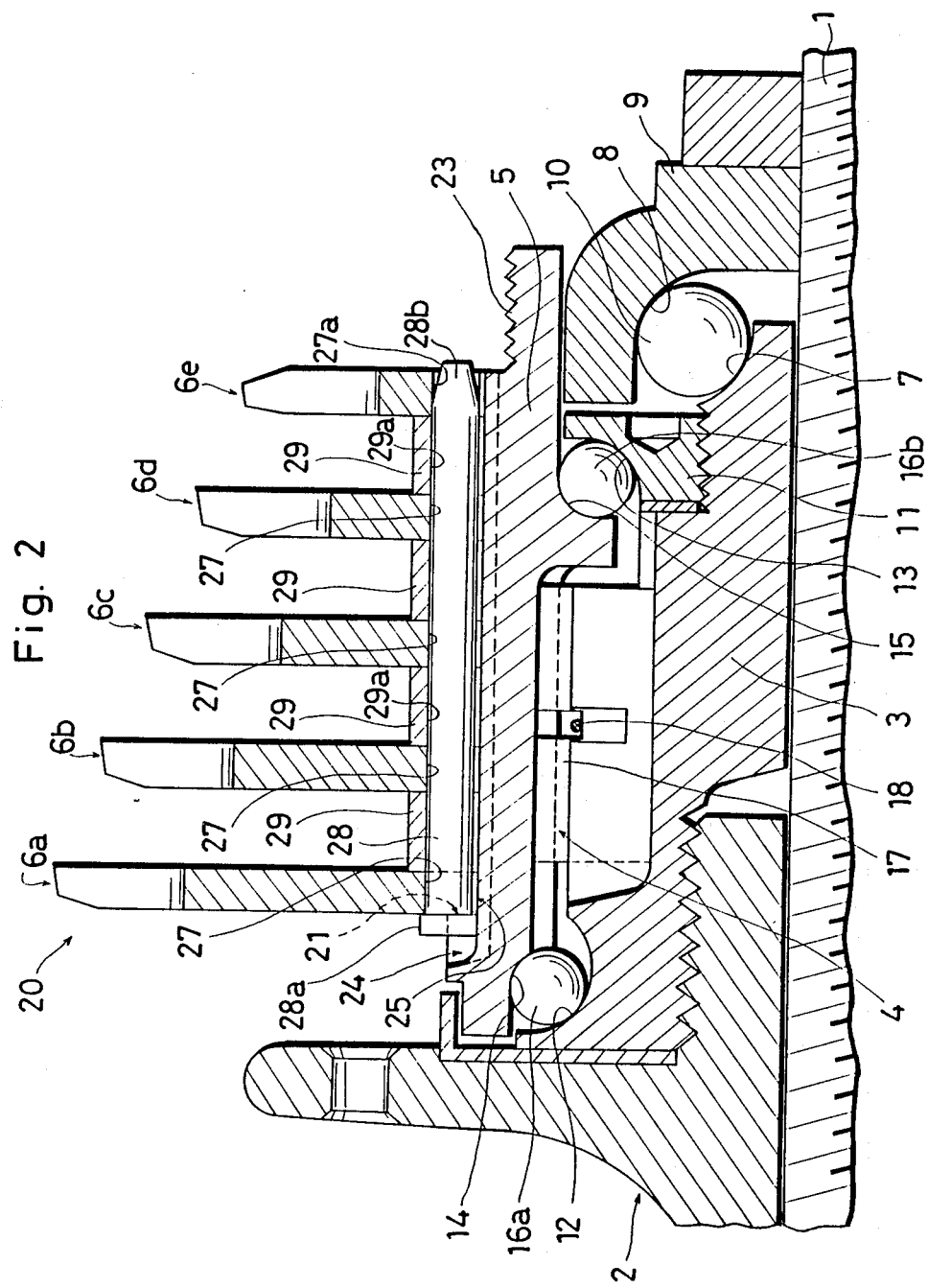
FIG. 2 is a view similar to FIG. 1 but showing the same freewheel in a conditioned just before complete assembly thereof.

Each retainer pin 28 penetrates the sprocket set 20 through the corresponding preassembly holes 27 of the sprockets 6a–6e and the corresponding preassembly holes 29a of the spacer rings 29. The retainer pin 28 has an enlarged head 28a for engagement with the largest sprocket 6a (inner most sprocket), as shown in FIG. 2. The pin head 28 is positioned in a corresponding shelter recess 24 of the stopper flange 21 when the sprocket set 20 is mounted on the sprocket ring 5. The retainer pin 28 has such a length that it projects slightly out from the smallest sprocket 6e (outermost sprocket) of the set 20 when the pin head 28a is in engagement with the largest sprocket 6a, as also illustrated in FIG. 2.

According to the invention, the preassembly holes 27 of the smallest sprocket 6e of the set 20 are slightly smaller in diameter than those of the other sprockets 6a–6d, as shown in FIG. 6. For the convenience of the subsequent description, the preassembly holes of the smallest sprocket 6e are designated by reference numeral 27a to make a distinction.

Because of the above mentioned difference in diameter between the two kinds of the preassembly holes 27, 27a, each retainer pin 28 is press-fitted in a corresponding preassembly hole 27a of the smallest sprocket 6e, whereas it penetrates through corresponding preassembly holes 27 of the other larger sprockets 6a–6d without such press-fitting relation. As a result, the larger sprockets 6a–6d are clamped between the enlarged head 28a of the retainer pin 28 and the smallest sprocket 6e fixedly press-fitted onto the pin 28 to integrate the set 20 of sprockets 6a–6e and spacer rings 29 into a preassembled unit prior to mounting on the sprocket ring 5.

The preassembled sprocket set 20, in which the respective sprockets 6a–6e are aligned with each other with respect to the central openings 25 and the engaging projections 26, can be easily mounted to the sprocket ring 5. Such a mounting operation is much more time-saving than separately mounting the individual sprockets and spacer rings in succession onto the sprocket ring 5.

The press-fitting relation between each retainer pin 28 and a corresponding preassembly hole 27a of the smallest sprocket 6e is required only to the extent to prevent unexpected separation of the preassembled sprocket set 20 during handling thereof before ultimate mounting onto the sprocket ring 5. According to the illustrated example, therefore, the retainer pin 28 has a tapered tip 28b to facilitate preassembly of the sprocket set 20 while providing minimum press-fit relative to the smallest sprocket 6e. The tapered tip 28b also fulfills another important function, as described below.

Axial movement of the sprocket set 20 relative to the sprocket ring 5 is prohibited by a nut member 30 screwed on the threaded portion 23 of the sprocket ring 5 into abutment with the outermost sprocket 6e of the set 20, as shown in FIG. 1. Thus, the sprocket set 20 is held in place between the stopper flange 21 of the sprocket ring 5 and the nut member 30.

Obviously, when the nut member 30 is screwably advanced on the threaded portion 23, it forces the tapered tip 28b of each retainer pin 28 to retreat into a corresponding preassembly hole 27a of the smallest sprocket 6e while simultaneously causing the pin head 28a to escape deeper into a corresponding shelter recess 24. As a result, the retainer pin 28 comes out of press fitting engagement with the smallest sprocket 6e. Thus, upon subsequent removal of the nut member 30, the individual sprockets 6a–6e and the spacer rings 29 can be separately removed with ease. This is particularly advantageous when it is necessary to replace only the smallest sprocket 6e.

Preferably, as shown in FIG. 1, the nut member 30 should be integrally formed with a sprocket portion 30a to increase the range of speed selection. Of course, the nut member 30 may serve the sole purpose of holding the sprocket set 20 in place.

It should be appreciated that the difference in diameter between the two kinds of preassembly holes 27, 27a is very small and somewhat exaggerated in FIG. 6.

The invention being thus described, it is obvious that the same may be varied in many ways. For instance, the diametrically smaller preassembly holes 27a of the smallest sprocket 6e may be replaced by holes which are diametrically equal to the preassembly holes 27 of the other sprockets 6a–6d but positioned slightly out of alignment therewith to come into local press-fit engagement with the respective retainer pins 28. Further, the number of sprockets to be incorporated into the set 20 may be optionally selected. Such variations are not to be regarded as a departure from the spirit and scope of the invention, and all such modifications as would be obvious to those skilled in the art are intended to be included within the scope of the following claims.

I claim:

1. A multiple-e freewheel for a bicycle comprising:
an inner ring;
an outer sprocket ring rotatably supported on said inner ring via a one-way clutch mechanism;
a set of diametrically different sprockets fittable axially onto said sprocket ring for co-rotation therewith and including an axially innermost sprocket and an axially outermost sprocket;
stopper means provided on said sprocket ring to engage with said innermost sprocket;
preassembly holes formed at corresponding positions of each sprocket;
a retainer pin insertable through a corresponding preassembly hole of said each sprocket, said pin having an enlarged head engageable with said innermost sprocket, said pin further having a tip projectable from said outermost sprocket with press-fit engagement in the preassembly hole thereof to enable preassembly of said set of sprockets, said tip being axially retractable into the preassembly hole of said outermost sprocket by an axial pressing force; and
presser means removably mountable onto said sprocket ring to engage with said outermost sprocket while axially pressing said tip of said retainer pin out of press-fit engagement with the corresponding preassembly hole of said outermost sprocket.

2. The freewheel as defined in claim 1, wherein said tip of said retainer pin is tapered.

3. The freewheel as defined in claim 1, wherein the preassembly holes of said outermost sprocket are slightly smaller in diameter than those of the other sprocket or sprockets.

4. The freewheel as defined in claim 1, wherein said each sprocket has a central opening for fitting onto said sprocket ring; and said preassembly holes are located adjacent to said central opening.

5. The freewheel as defined in claim 4, wherein said preassembly holes merge with said central opening.

6. The freewheel as defined in claim 1, wherein said stopper means is in the form of an annular stopper flange provided at an axially inner end of said sprocket ring.

7. The freewheel as defined in claim 6, wherein said annular flange has shelter recesses each for receiving said enlarged head of said retainer pin while allowing axial retreating movement thereof.

8. The freewheel as defined in claim 1, wherein said presser means provides an additional sprocket.

9. The freewheel as defined in claim 1, wherein said sprocket ring has an axially outer end formed with an externally threaded portion; and said presser means is in the form of a nut member screwed onto said threaded portion.

10. The freewheel as defined in claim 1, further comprising a spacer ring interposed between each two adjacent sprockets and having preassembly holes in corresponding relation to those of said each sprocket.

11. A sprocket assembly for a bicycle freewheel comprising:

a set of diametrically different sprockets spaced axially from each other and including an axially innermost sprocket and an axially outermost sprocket; preassembly holes formed at corresponding positions of said each sprocket; and a retainer pin inserted through a corresponding preassembly hole of said each sprocket, said pin having an enlarged head engaging with said innermost sprocket, said pin further having a tip projecting from said outermost sprocket with press-fit engagement in said corresponding preassembly hole thereof to hold said set of sprockets in a preassembled condition, said tip being retractable into said corresponding preassembly hole of said outermost sprocket by an axial pressing force to come out of said press-fit engagement.

* * * * *